United States Patent [19]

Hamburg et al.

[11] Patent Number: 5,465,697
[45] Date of Patent: Nov. 14, 1995

[54] COLD START ENGINE AIR/FUEL CONTROL SYSTEM

[75] Inventors: Douglas R. Hamburg, Bloomfield; Eleftherios M. Logothetis, Birmingham; Daniel L. Meyer, Dearborn, all of Mich.

[73] Assignee: Ford Motor Company, Dearborn, Mich.

[21] Appl. No.: 350,437

[22] Filed: Dec. 6, 1994

[51] Int. Cl.⁶ .................. F02P 5/15; F02D 41/14
[52] U.S. Cl. ............... 123/424; 123/674; 123/685; 123/694
[58] Field of Search ................. 123/406, 674, 123/688, 689, 693, 694, 424, 685; 60/274, 266; 204/406, 425

[56] References Cited

U.S. PATENT DOCUMENTS

| | | | |
|---|---|---|---|
| 4,109,615 | 8/1978 | Asano | 123/686 |
| 4,120,269 | 10/1978 | Fujishiro | 123/695 |
| 4,132,200 | 1/1979 | Asano et al. | 123/694 |
| 4,144,853 | 3/1979 | Maruoka et al. | 123/339.11 |
| 4,170,965 | 10/1979 | Aono | 123/695 |
| 4,187,806 | 2/1980 | Schurle et al. | 123/695 |
| 4,376,026 | 3/1983 | Hoffman et al. | 204/195 S |
| 4,626,338 | 12/1986 | Kondo et al. | 204/406 |
| 4,936,276 | 6/1990 | Gopp | 123/425 |
| 5,203,300 | 4/1993 | Orzel | 123/339 |
| 5,211,011 | 5/1993 | Nishikawa et al. | 60/284 |
| 5,228,421 | 7/1993 | Orzel | 123/339 |
| 5,245,979 | 9/1993 | Pursifull et al. | 123/690 |
| 5,253,631 | 10/1993 | Curran | 123/696 |

*Primary Examiner*—Tony M. Argenbright
*Attorney, Agent, or Firm*—Allan J. Lippa; Roger L. May

[57] ABSTRACT

An air/fuel control system (8) generates a fuel command (100) for fuel delivery to the engine (28) based upon at least an amount of air inducted into the engine. This fuel command is trimmed by a feedback variable derived (240–282) from an exhaust gas oxygen sensor (44) when feedback control is initiated. Feedback control is commenced when the peak-to-peak output of the sensor is less than a threshold value (122–128) while pumping current applied to a sensor electrode is modulated (122–128). Modulation is then removed but the pumping current is maintained to shift the sensor output to a preselected lean air/fuel ratio (128). Lean air/fuel feedback control continues until the converter is warmed (130–140).

18 Claims, 6 Drawing Sheets

COLD START ENGINE AIR/FUEL CONTROL SYSTEM

BACKGROUND OF THE INVENTION

The field of the invention relates to engine air/fuel control systems.

Feedback or closed-loop control systems are known in which fuel delivery to an engine is trimmed by a feedback variable derived from an exhaust gas oxygen sensor. Under ideal conditions, feedback control maintains the air/fuel ratio within the peak efficiency window of a catalytic converter. However, converter efficiency is not maximized until the converter reaches a desired temperature.

U.S. Pat. No. 5,211,011 describes a system in which fuel delivered to the engine is alternately modulated rich and then modulated lean while a measurement of converter temperature is below a desired temperature. Ignition timing is also retarded until a converter temperature measurement reaches the desired temperature to more rapidly warm the converter. Thereafter, fuel is adjusted in response to a feedback variable derived from the exhaust gas oxygen sensor.

The inventors herein have recognized several problems with the above approaches. One problem is that air/fuel feedback control is not entered until the converter temperature reaches a desired temperature. Feedback control may thereby be delayed more than necessary resulting in unnecessary emissions. Another problem is that modulation of the fuel delivered may increase emissions. And, if fuel modulation continues during air/fuel feedback control, the range of authority of the feedback control system may be skewed thereby reducing its ability to control air/fuel ratio.

SUMMARY OF THE INVENTION

An object of the invention claimed herein is to rapidly warm the converter and initiate air/fuel feedback control while maintaining smooth engine operation and minimizing emissions.

The problems of prior approaches are overcome, and the objects and advantages of the claimed invention achieved, by providing a control method and system for an internal combustion engine responsive to an exhaust gas oxygen sensor positioned in the engine exhaust upstream of a catalytic converter. In one aspect of the invention, the control system comprises: an exhaust gas oxygen sensor positioned in the engine exhaust; a current generating circuit coupled to an electrode of the exhaust gas oxygen sensor for coupling current thereto in a direction to shift an output of the exhaust gas oxygen sensor in a lean air/fuel direction; a modulating circuit for modulating the current; a fuel controller commencing a feedback control mode when a monitoring signal derived from an output of the exhaust gas oxygen sensor exceeds a threshold value, the fuel controller adjusting a fuel delivery signal in response to a feedback variable derived from the exhaust gas oxygen sensor output during the feedback control; and a fuel delivery system providing fuel to the engine in response to the fuel delivery signal.

An advantage of the above aspect of the invention is that lean air/fuel control is provided to more rapidly heat the catalytic converter. Another advantage of the invention is that lean air/fuel control is provided while using feedback control to maintain the engine's air/fuel ratio at a preselected lean air/fuel ratio offset from the stoichiometric air/fuel ratio by a preselected amount. An advantage obtained is that lean air/fuel operation is provided with decreased emissions. Still another advantage is that lean air/fuel control and operation is provided while maintaining the full range of authority of the feedback controller. Another advantage is that air/fuel feedback control is initiated at the exact time the output of the exhaust gas oxygen sensor becomes suitable for feedback control. The problems of prior approaches which only guess at when the exhaust gas oxygen sensor becomes operable are thereby avoided. Still another advantage is that modulation of the exhaust gas oxygen sensor output is achieved without perturbing the engine's air/fuel ratio.

In another aspect of the invention, the control method comprises the steps of: delivering fuel to the engine in response to a fuel delivery signal; coupling electric current to an electrode of the exhaust gas oxygen sensor in a direction to shift an output of the exhaust gas oxygen sensor in a lean air/fuel direction; modulating the current until a feedback control mode is initiated when a monitoring signal derived from an output of the exhaust gas oxygen sensor satisfies a threshold value; and adjusting the fuel delivery signal in response to a feedback variable derived from the exhaust gas oxygen sensor output during the feedback control mode.

Preferably, a first set of correction values is adaptively learned during a portion of the feedback control mode while the current is being coupled to the exhaust gas oxygen sensor, the first set of correction values being learned by comparing the feedback variable to a first reference and correcting the fuel delivery signal in response to the first set of correctional values.

In addition to the previously recited advantages, an additional advantage of the invention is that the adaptive learning eliminates any errors between actual air/fuel operation and desired air/fuel operation, including the lean air/fuel offset, during air/fuel control before the converter reaches its desired operating temperature.

BRIEF DESCRIPTION OF THE DRAWINGS

The object and advantages of the claimed invention will become more readily apparent from the following detailed description of an example of operation described with reference to the drawings wherein:

DESCRIPTION OF THE PREFERRED EMBODIMENT

Figure 1:
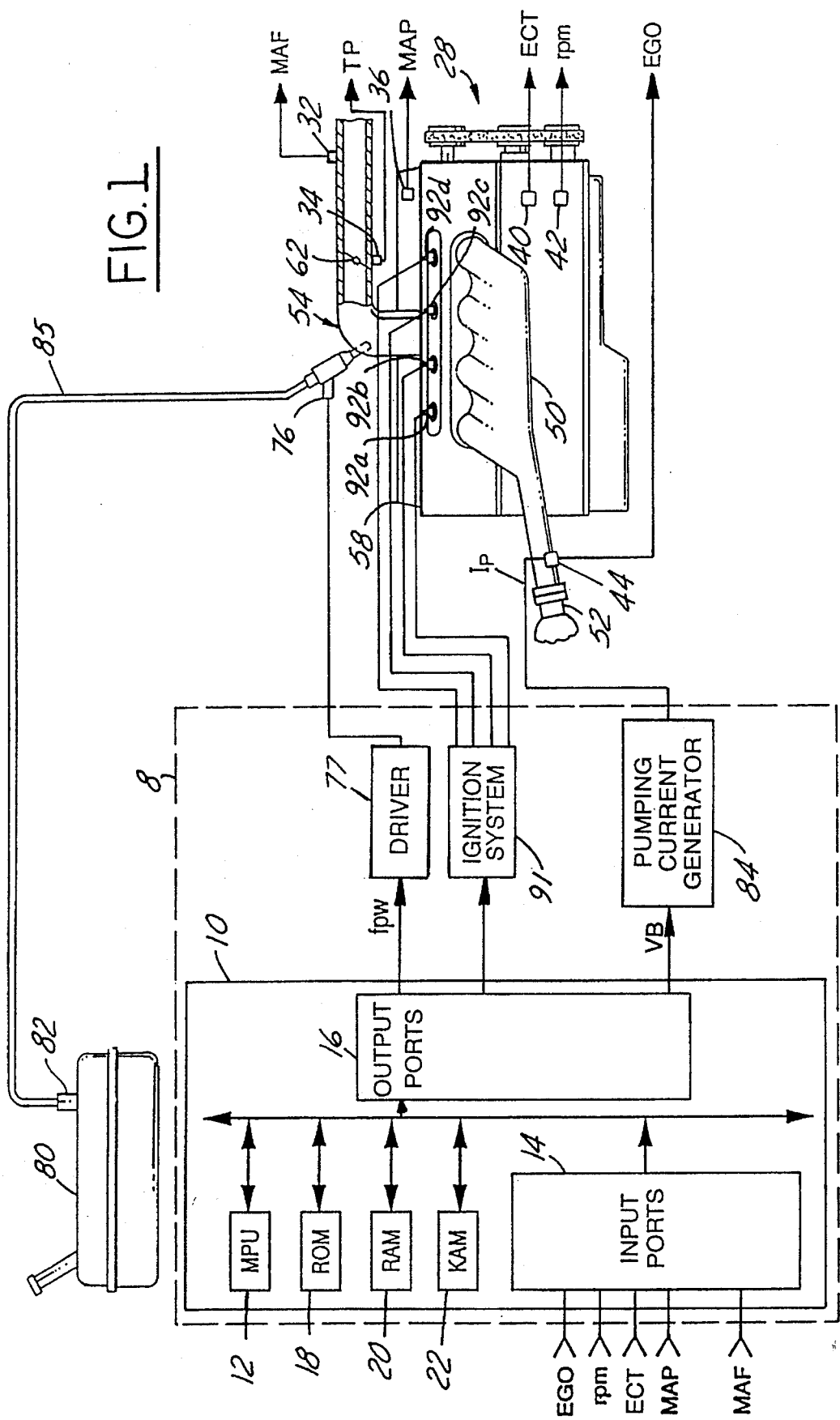
FIG. 1 is a block diagram of an embodiment in which the invention is used to advantage.

Controller 8 is shown in the block diagram of FIG. 1 including conventional microcomputer 10 having: microprocessor unit 12; input ports 14; output ports 16; read only memory 18, for storing control programs; random access memory 20, for temporary data storage which may also be used for counters or timers; keep-alive memory 22, for storing learned values; and a conventional data bus. As described in greater detail later herein, controller 8 controls operation of engine 28 by the following control signals; pulse width signal fpw for controlling liquid fuel delivery via drivers 77; and conventional distributorless ignition system 91 for providing ignition current to spark plugs 92a–d.

Other conventional engine systems are not shown because they are well known to those skilled in the art and are not necessary for an understanding of the invention claimed herein. For example, a conventional exhaust gas recirculation system iS not shown. Further, a conventional fuel vapory recovery system is not shown.

Controller 8 is shown receiving various signals from conventional engine sensors coupled to engine 28 including: measurement of inducted mass airflow (MAF) from mass airflow sensor 32; manifold absolute pressure (MAP), commonly used as an indication of engine load, from pressure sensor 36; engine coolant temperature (ECT) from temperature sensor 40; indication of engine speed (rpm) from tachometer 42; and output signal EGO from exhaust gas oxygen sensor In a conventional manner, controller 8 compares signal EGO to a reference signal ($V_R$), preferably at the mid-point in peak-to-peak excursion of signal EGO, to generate two-state signal EGOS. An indication is thereby provided whether exhaust gases are either rich or lean of stoichiometric combustion by the output states of signal EGOS. The feedback control system described later herein with particular reference to FIGS. 3–5 maintains the average air/fuel ratio at the switch point (i.e., change in output state) of EGO sensor 44.

Continuing with FIG. 1, engine 28 is shown having EGO sensor 44 coupled to exhaust manifold 50 upstream of conventional catalytic converter 52. Intake manifold 58 of engine 28 is shown coupled to throttle body 54 having primary throttle plate 62 positioned therein. Throttle body 54 is also shown having fuel injector 76 coupled thereto for delivering liquid fuel in proportion to the pulse width of signal fpw from controller 8. Fuel is delivered to fuel injector 76 by a conventional fuel system including fuel tank 80, fuel pump 82, and fuel rail 85.

As described in greater detail below with particular reference to FIG. 2, pumping current generator 84 provides pumping current Ip to EGO sensor 44 in response to signal VB from controller 8. Signal VB is either a discrete voltage level to provide a constant pumping current, or signal VB is modulated by controller 8 to provide a modulated pumping current. Such modulation may be either sinusoidal, triangular, or a square wave.

Figure 2:
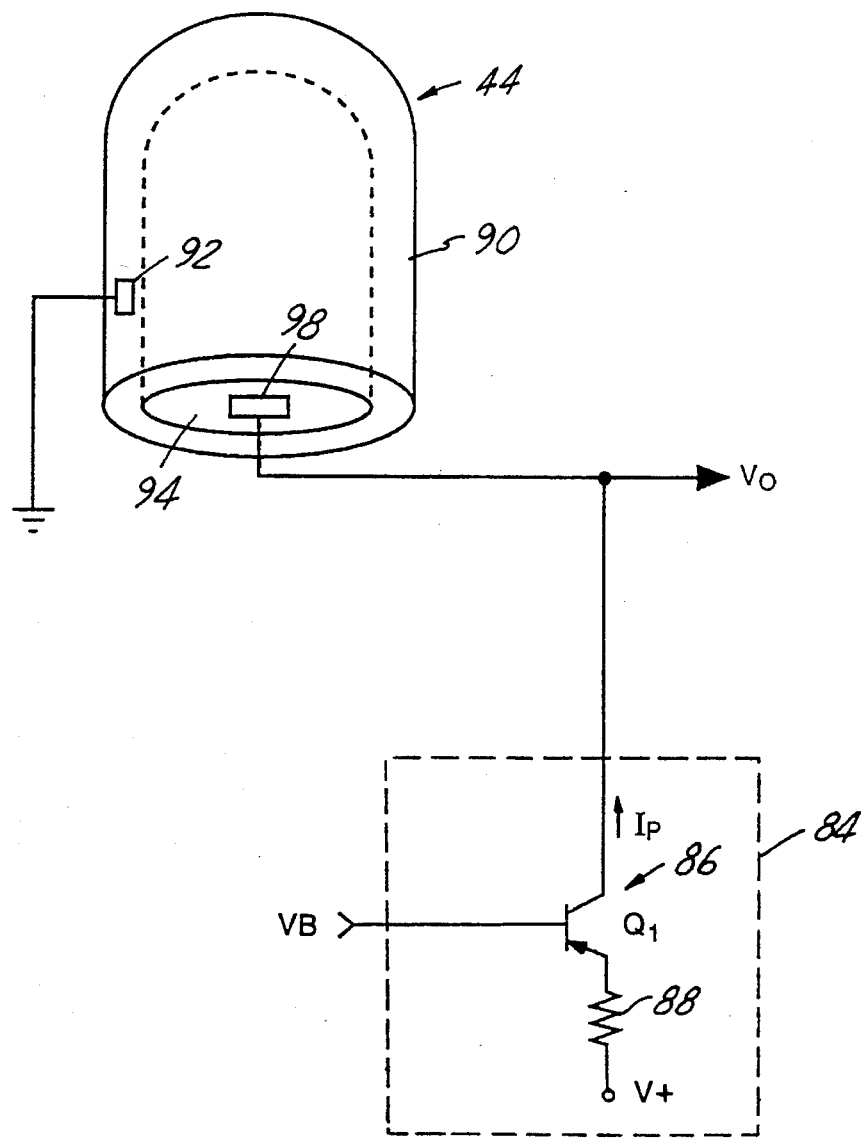
FIG. 2 is a perspective sectional view of the exhaust gas oxygen sensor shown in FIG. 1 with a pumping current generator coupled thereto.

Referring now to FIG. 2, a perspective sectional view of EGO sensor 44 is shown having electrode 90 positioned on its outer surface. Electrode lead 92 is shown coupled between electrode 90 and signal ground. Electrode 90 communicates with the engine exhaust downstream of converter 52 as previously described herein. A second electrode (94) is shown positioned on the inner surface of EGO sensor 44 for communicating with ambient air to provide a reference value. Lead 98 is shown coupled to electrode 90 for providing electrical connection to pumping current generator 84.

Pumping current generator 84 is shown having the collector terminal of transistor 86 coupled to electrode lead 98 for pumping current Ip thereto. Resistor 88 is shown coupled in series between a voltage reference, such as 12 volts, and the emitter terminal of transistor 86. The base terminal of transistor 86 is shown coupled to controller 8 for receiving signal VB as previously described above. In operation, when controller 8 provides voltage VB at a sufficient DC voltage level, transistor 86 is turned on thereby providing pumping current Ip to electrode 94 of EGO sensor 44. When controller 8 modulates signal VB, pumping current Ip is modulated in relation to the modulation of signal VB.

Figure 3A:
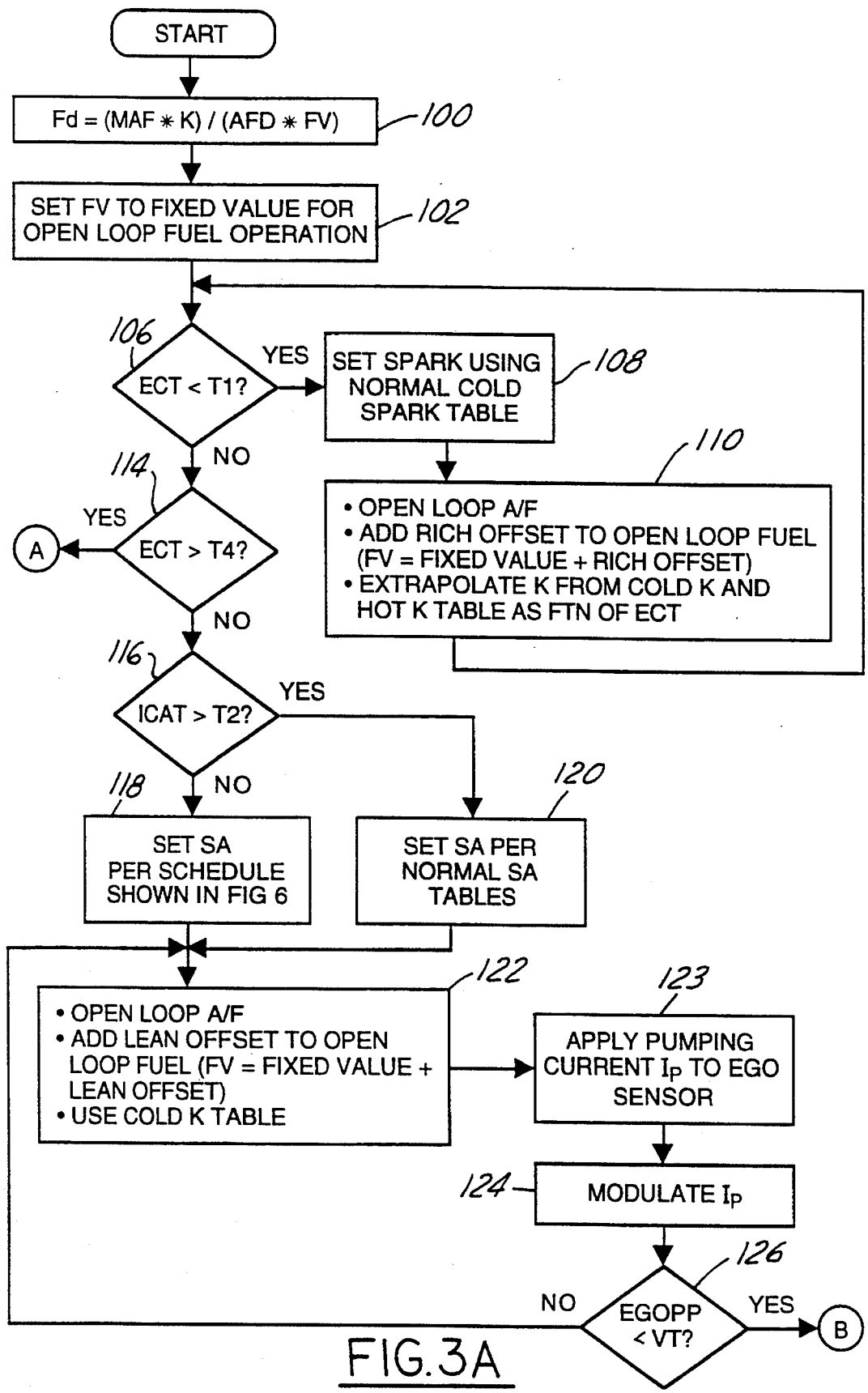
FIGS. 3A–3B, and 4–5 are flowcharts of various operations performed by portions of the embodiment shown in FIG. 1.
Figure 3B:
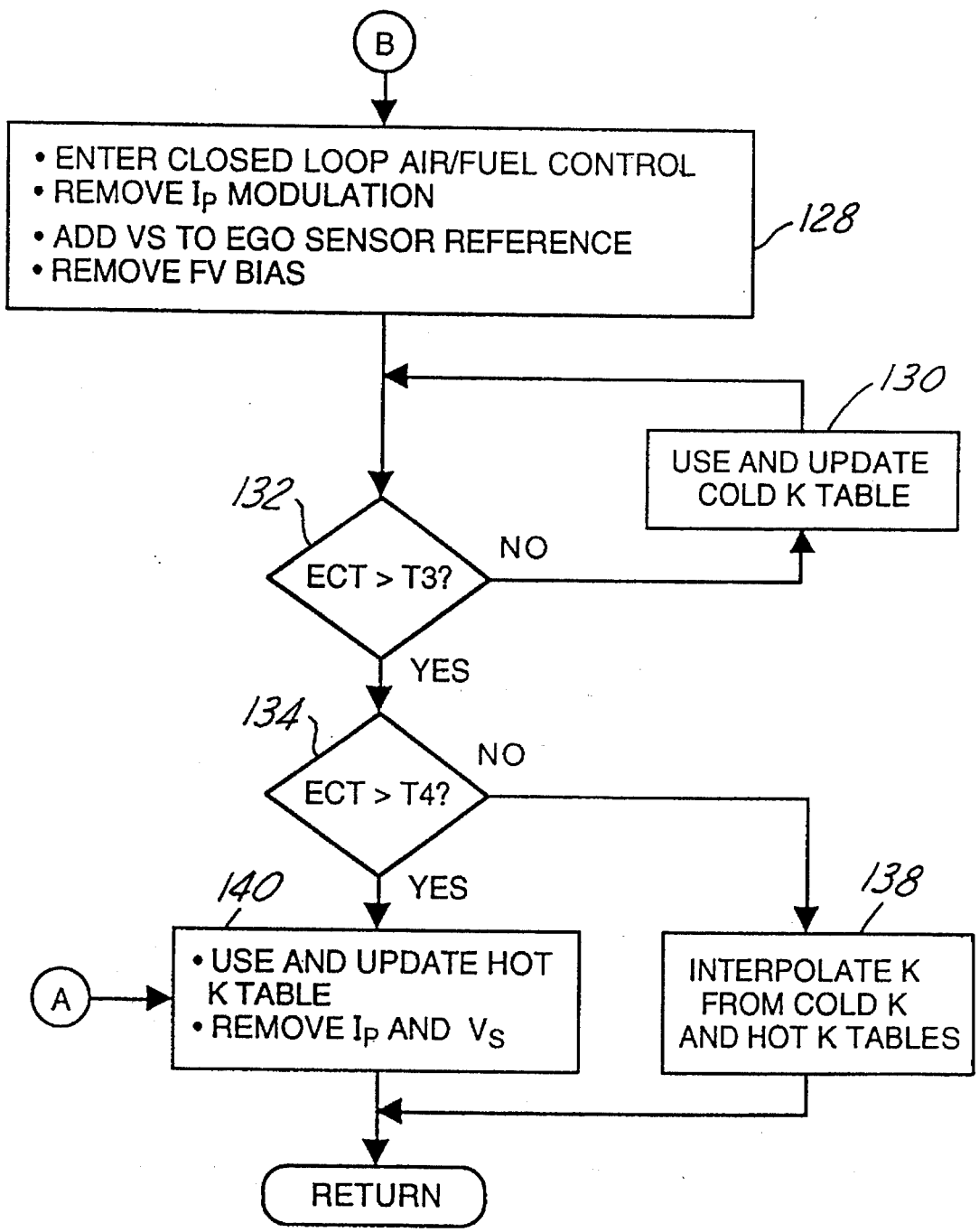

A description of various air/fuel operations performed by controller 8 is now commenced with initial reference to the flow charts shown in FIGS. 3A–3B. During step 100, the fuel command (shown as desired fuel quantity Fd) is calculated by dividing the product of desired air/fuel ratio AFD times feedback variable FV into the product of inducted mass flow measurement MAF times correction value K. In this particular example, desired air/fuel ratio AFD is the stoichiometric value of the fuel blend used which is 14.3 pounds of air per pound of fuel for a low emissions fuel blend. Feedback variable FV and correction value K are each generated by the feedback routines, responsive to EGO sensor 44, which are described latter herein with particular reference to respective FIGS. 4 and 5.

Continuing with FIGS. 3A–3B, feedback variable FV is initially set to a fixed value for open loop air/fuel operation (step 102). Stated another way, desired fuel quantity Fd provides an open loop fuel command which is related to signal MAF and is not adjusted by feedback. In this particular example, feedback variable FV is set to unity which would correspond to operation at desired air/fuel ratio AFD under ideal operating conditions without any engine component aging. However, this value may not result in open loop engine air/fuel operation exactly at stoichiometry due to aging of components such as fuel injectors and mass airflow motors. Correction by correction value K will be provided as described below to maintain the desired open loop air/fuel operation regardless in variations of the outputs in components which may occur with time.

When engine coolant temperature ECT is less than predetermined temperature T1 (step 106), engine temperature is too low to enter the subroutine for converter warm-up. The subroutine described with reference to steps 108-110 is then entered to minimize the time required to start and reliably warm-up engine 28. In step 108, ignition timing is first set using the cold start table stored in microcomputer 10. Various sub steps are then performed during step 110. Open loop air/fuel operation proceeds by adding a rich offset to desired fuel quantity Fd to aid cold engine operation. In this particular example, feedback variable FV is set to a fixed value less than unity to provide such rich offset. Correction value K is then extrapolated from two tables stored in microcomputer 10 which store correction K for cold engine operation and hot engine operation, respectively. In this example, the extrapolation occurs as a function of engine coolant temperature ECT.

Figure 6:
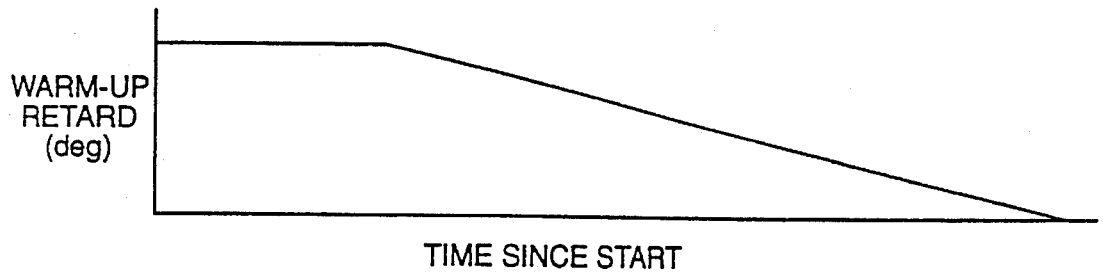
FIG. 6 graphically illustrates an ignition timing function performed by a portion of the embodiment shown in FIG. 1.

When engine coolant temperature ECT is greater than temperature T1 (step 106), it is compared to temperature T4 (step 114) which is associated with hot engine operation and normal air/fuel ratio control. If engine coolant temperature ECT is less than temperature T4, an inference of the temperature of catalytic converter 52 (ICAT) is compared to temperature T2 (step 116). When inferred temperature ICAT is less than temperature T2, ignition timing is set per the schedule described later herein with particular reference to FIG. 6 (step 118). On the other hand, if inferred temperature ICAT is greater than temperature T2, then normal ignition timing tables are utilized (step 120). Ignition timing is commonly referred to as spark advance (SA) from cylinder top dead center position (TDC) in degrees of crankshaft angles (CA).

After ignition timing is established as described above, a predetermined lean offset is imposed on desired fuel quantity Fd (step 122). Stated another way, open loop fuel control continues with a lean offset imposed on the open loop fuel quantity commanded so that the exhaust air/fuel ratio is lean of stoichiometry by a preselected amount. In this particular example, the lean offset is provided by setting feedback variable FV to a fixed value and increasing this fixed value by a predetermined amount correlated with the desired lean offset as a function of ECT (step 122). Further, correction value K is read from the table of microcomputer 10 storing cold correction values for a plurality of engine speed and load cells. As described later herein, each correction value K is subsequently generated from closed loop air/fuel feedback control. Also, each correction value K advantageously corrects any error between the open loop lean offset provided by the open loop fuel command and the desired lean shift in air/fuel ratio from stoichiometry.

An advantage of the above described correction is that precise lean air/fuel control and smooth engine operation are obtained which was not heretofore possible with prior art approaches. Because prior art approaches relied on simply an open loop lean shift in air/fuel ratio, the actual lean shift in air/fuel ratio may have been too lean resulting in rough engine operation. This problem is solved as described in more detail below by application of correction value K to the open loop fuel command.

The above described open loop air/fuel operation continues until closed loop conditions are detected in steps 123–126. Closed loop conditions are detected by first applying modulated signal VB to pumping current generator 84 which, in turn, couples modulated current Ip to electrode 94 of EGO sensor 44 (steps 123 and 124). When the peak-to-peak output of EGO sensor 44 (EGOPP) is less than threshold value VT (step 125), closed loop operations are entered (step 128). Modulation of pumping current Ip is then removed (step 128). Controller 8 then adds signal voltage Vs to the EGO sensor reference to correct for shifts in the output of EGO sensor 44 caused by the voltage drop across its internal impedance due to pumping current Ip.

Continuing with step 128, the lean offset is removed from signal FV and the lean offset is now generated by feedback from EGO sensor 44 with the transition in output states of EGO sensor 44 being shifted to a preselected lean air/fuel ratio by pumping current Ip. Stated another way, the lean offset in the change of output states of EGO sensor 44 will result in engine air/fuel operation which averages to the preselected air/fuel ratio. This lean offset continues during feedback control until engine coolant temperature exceeds temperature T4 (step 134) at which time pumping current Ip is removed (step 140). Air/fuel feedback control is described in more detail later herein with particular reference to FIG. 4.

To more closely align the average air/fuel ratio with the preselected lean air/fuel ratio, desired fuel quantity Fd is further corrected by a correction value K for each engine speed load operating range (step 130) provided ECT is not greater than T3 (step 132). And, as described later herein with particular reference to FIG. 5, each correction value K is adaptively learned in response to various signal process steps performed on the output of EGO sensor 44.

The closed loop operation described above continues until engine coolant temperature ECT is greater than predetermined temperature T3 (step 132). When engine coolant temperature ECT is greater than temperature T3, but less than temperature T4 (step 134), each correction value K is interpolated from the cold K and hot K tables stored in microcomputer 10 for each engine speed load range (step 138). Other than selection of correction value K, closed loop operation continues as previously described above.

In the event engine coolant temperature ECT is greater than temperature T4 (step 134), each correction value K is selected from the hot K tables of microcomputer 10 (step 140). In addition, the lean air/fuel offset is removed by removing pumping current Ip and signal Vs (step 140). Normal air/fuel feedback control which will average at desired air/fuel ratio AFD is thereby commenced in step 140.

Figure 5:
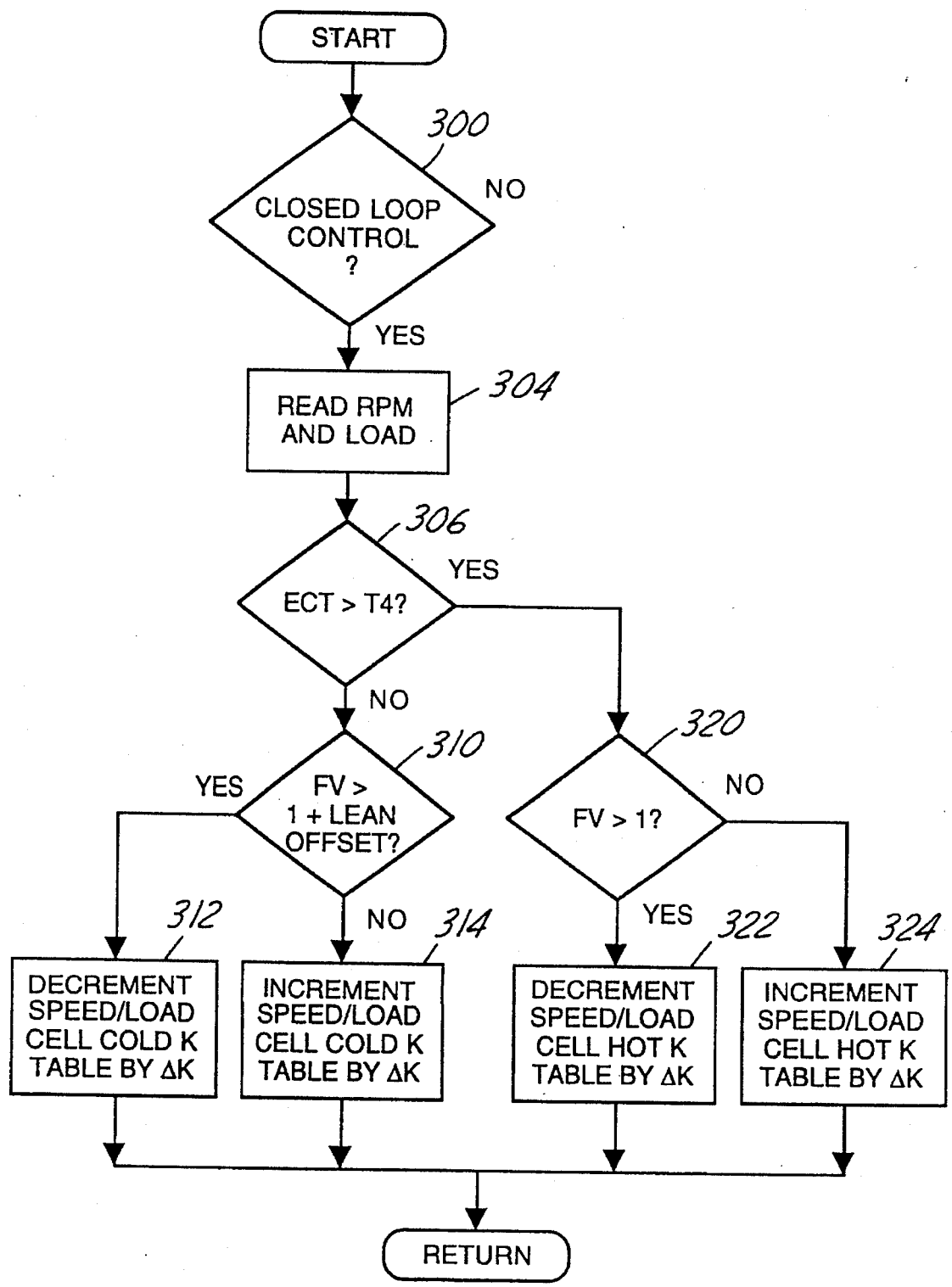

It is noted that correction value K for the hot K table is generated by adaptive learning as described later herein with particular reference to FIG. 5. By generating two sets of correction values (K) for cold and hot engine operation, and either extrapolating (step 110) or interpolating (step 138) between the tables, more accurate air/fuel operation is obtained. Once again, engine air/fuel operation is provided at either stoichiometry or preselected air/fuel ratios lean of stoichiometry by a preselected amount far more accurately than heretofore possible. Emissions are thereby minimized and overly lean operation which may result in engine stumble is avoided.

The air/fuel feedback subroutine executed by controller 8 to generate fuel feedback variable FV is now described with reference to the flowchart shown in FIG. 4. A determination is first made that closed loop (i.e., feedback) air/fuel control is desired in step 240 in the same manner as previously described herein with reference to step 126 in FIGS. 3A–3B. Next, the subroutine determines whether feedback variable FV should be biased in step 244. In the event bias is not required, integral term $\Delta i$ is set equal to integral term $\Delta j$, and proportional term Pi is set equal to proportional term Pj (step 246).

Figure 4:
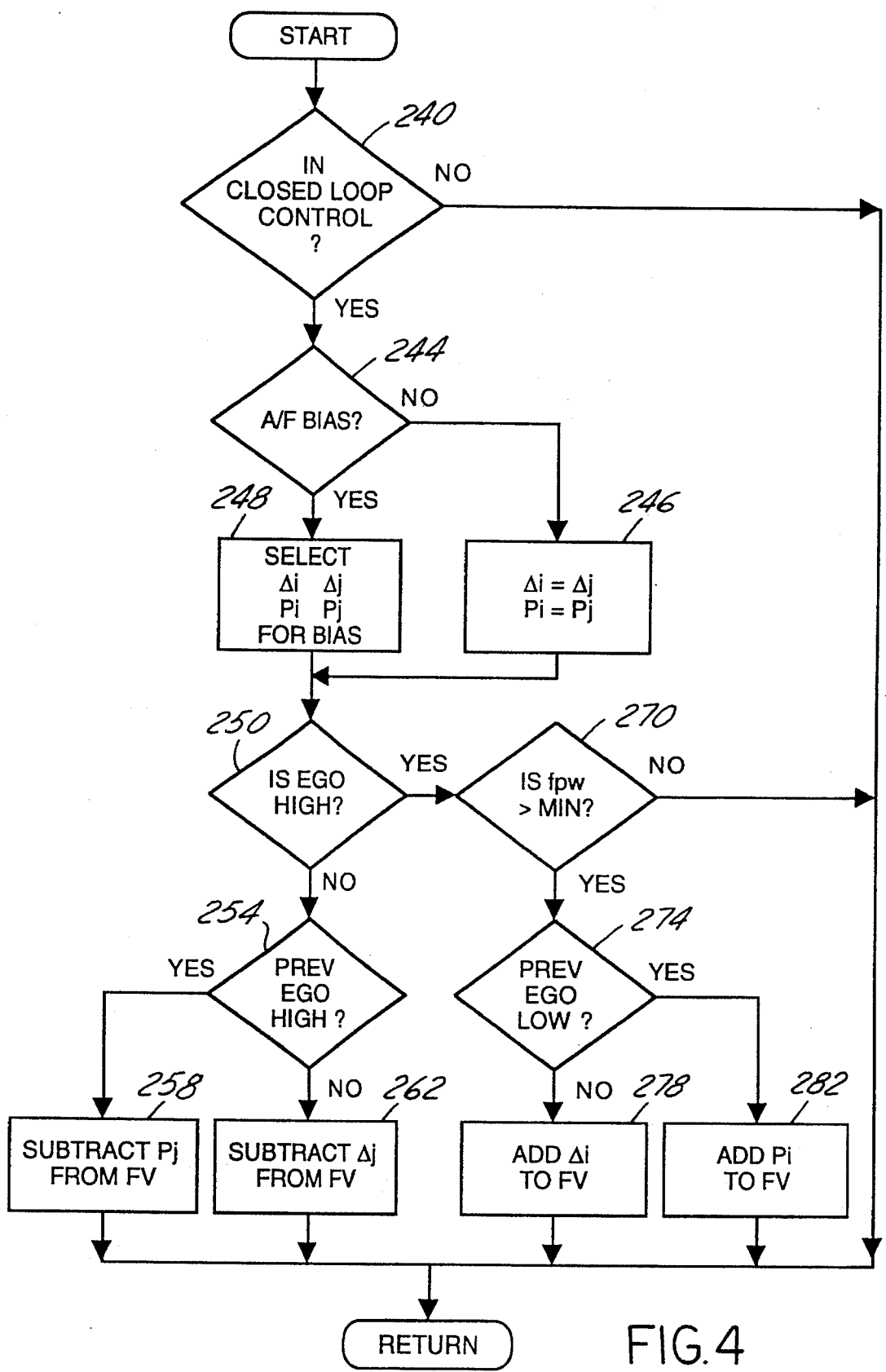

The specific manner in which the proportional and integral terms generate feedback variable FV is now described with respect to steps 250–282 of the subroutine shown in FIG. 4. EGO sensor 44 is sampled in step 250 during each background loop of controller 8. When EGO sensor 44 is low (i.e., lean), but was high (i.e., rich) during the previous background loop (step 254), proportional term Pj is subtracted from signal FV in step 258. When EGO sensor 44 is low, and was also low during the previous background loop, integral term $\Delta j$ is subtracted from signal FV in step 262. Accordingly, in this particular example of operation, proportional term Pj represents a predetermined rich correction which is applied when EGO sensor 44 switches from rich to lean. Integral term $\Delta j$ represents an integration step to provide continuously increasing rich fuel delivery when EGO sensor 44 continues to indicate combustion lean of stoichiometry.

When fpm is greater than a minimum value MIN (step 270) and when EGO sensor 44 is high but was low during the previous background loop (step 274), proportional term Pi is added to signal FV in step 282. When EGO sensor 44 is high, and was also high during the previous background loop, integral term $\Delta i$ is added to signal FV in step 278. Proportional term Pi represents a proportional correction in a direction to decrease fuel delivery when EGO sensor 44 switches from lean to rich. Integral term $\Delta i$ represents an integration step in a fuel decreasing direction while EGO sensor 44 continues to indicate combustion rich of stoichiometry.

The adaptive learning subroutine for learning correction value K during both cold engine and hot engine operation is now described with reference to the flowchart shown in FIG. 5. Operation for entering closed loop air/fuel control is first determined in step 300 in a similar manner to that previously described with reference to step 126 in FIGS. 3A–3B. Engine speed and load are then read during step 304 and the correction values generated below stored in separate cells of a table corresponding to a speed load range.

When engine coolant temperature ECT is less than temperature T4 (step 306) and also less than T3, the cold K table cells are updated as now described. If feedback variable FV is greater than its nominal value (unity in this example) plus the lean offset introduced as previously described with reference to FIGS. 3A–3B (step 310), then the appropriate speed/load cell of the cold K table is decremented by ΔK (step 312). On the other hand, if feedback variable FV is less than unity plus the lean offset (step 310), the corresponding speed/load cell in the cold K table is incremented by ΔK (step 314).

Operation proceeds in a similar manner to adaptively learn correction value K during hot engine operation when engine coolant temperature ECT is greater than temperature T4 (step 306). More specifically, when feedback variable FV is greater than unity (step 320), the appropriate speed/load cell of the hot K table is decremented by ΔK (step 322). Similarly, when feedback variable FV is less than unity (step 320), the appropriate speed/load cell of the hot K table is incremented by ΔK (step 324).

The subroutine described above with respect to FIG. 5 provides an adaptive learning of the difference or error between actual engine air/fuel operation and the desired air/fuel ratio. It is also operable when the desired air/fuel ratio is offset from stoichiometry by a preselected offset.

The previously described operation of lean air/fuel operation reduces the warm-up period of catalytic converter 52 thereby reducing engine emissions. The ignition retard schedule, described with reference to FIG. 6, also decreases the warm-up time for catalytic converter 52. These operations are performed more accurately than heretofore possible. For example, adaptive learning of correction factor K during hot and cold operation enables precise air/fuel control at any desired air/fuel ratio including a lean offset ratio. Further, the above described ignition retard schedules are accomplished in such a manner as to eliminate any undesired effect on engine power or stability.

Although one example of an embodiment which practices the invention has been described herein, there are numerous other examples which could also be described. For example, analog devices, or discreet IC's may be used to advantage rather than a microcomputer. Further, proportional rather than two-state exhaust gas oxygen sensors may be used to advantage. The invention is therefore to be defined only in accordance with the following claims.

What is claimed:

1. An air/fuel control system for an engine having its exhaust coupled to a catalytic converter, comprising:

an exhaust gas oxygen sensor positioned in the engine exhaust;

a current generating circuit coupled to an electrode of said exhaust gas oxygen sensor for coupling current thereto in a direction to shift an output of said exhaust gas oxygen sensor in a lean air/fuel direction;

a modulating circuit for modulating said current; and a fuel controller commencing a feedback control mode when a monitoring signal derived from an output of said exhaust gas oxygen sensor satisfies a threshold value, said fuel controller adjusting a fuel delivery signal in response to a feedback variable derived from said exhaust gas oxygen sensor output during said feedback control; and a fuel delivery system providing fuel to the engine in response to said fuel delivery signal.

2. The system recited in claim 1 wherein said modulating circuit ceases modulating said current in response to said monitoring signal satisfying said threshold value.

3. The control system recited in claim 2 wherein said exhaust gas oxygen sensor output has a transition in output states at a preselected engine air/fuel ratio and said preselected air/fuel ratio is shifted by a preselected amount in a lean direction in response to said current.

4. The control system recited in claim 3 wherein said fuel controller provides said fuel delivery signal in response to a measurement of airflow inducted into the engine and wherein said fuel controller offsets said fuel delivery signal by a preselected amount in a lean direction during an open loop fuel control mode which is prior to said feedback control mode.

5. The control system recited in claim 4 further comprising an adaptive controller for adaptively learning a first set of correction values during a portion of said feedback fuel control mode while said current is being coupled to said exhaust gas oxygen sensor, said first set of correction values being learned by comparing said feedback variable to a first feedback variable reference.

6. The system recited in claim 5 wherein said current generating circuit ceases coupling said current when engine temperature exceeds a threshold value.

7. The control system recited in claim 6 further comprising an adaptive controller for adaptively learning a second set of correction values during a portion of said feedback fuel control mode after said current is coupled to said exhaust gas oxygen sensor, said second set of correction values being learned by comparing said feedback variable to a second feedback variable reference.

8. The control system recited in claim 5 wherein said fuel controller corrects said fuel delivery signal in response to said first set of correction values.

9. The control system recited in claim 7 wherein said fuel controller corrects said fuel delivery signal in response to said second set of correction values.

10. The control system recited in claim 1 wherein said controller generates said monitoring signal from peak-to-peak excursions in said exhaust gas oxygen sensor output.

11. The control system recited in claim 3 further comprising an ignition system including an ignition controller retarding ignition timing during said preselected air/fuel ratio shift.

12. An air/fuel control method responsive to an exhaust gas oxygen sensor positioned in the engine exhaust upstream of a catalytic converter, comprising the steps of:

delivering fuel to the engine in response to a fuel delivery signal;

coupling electric current to an electrode of said exhaust gas oxygen sensor in a direction to shift an output of said exhaust gas oxygen sensor in a lean air/fuel direction;

modulating said current until a feedback control mode is initiated when a monitoring signal derived from an output of said exhaust gas oxygen sensor satisfies a threshold value; and adjusting said fuel delivery signal in response to a feedback variable derived from said exhaust gas oxygen sensor output during said feedback control mode.

13. The method recited in claim 12 further comprising the step of removing said electric current from said electrode in response to an indication is provided that the converter is operating at desired efficiency.

14. The method recited in claim 12 further comprising the step of compensating said exhaust gas oxygen sensor to correct for changes in internal impedance of said exhaust gas oxygen sensor caused by said current output while said current is being coupled to said first electrode.

15. An air/fuel control method responsive to an exhaust gas oxygen sensor positioned in the engine exhaust upstream of a catalytic converter, comprising the steps of:

delivering fuel to the engine in response to a fuel delivery signal derived from a measurement of airflow inducted into the engine;

retarding engine ignition timing until an indication is provided that the converter has reached a desired temperature;

coupling electric current to an electrode of said exhaust gas oxygen sensor in a direction to shift an output of said exhaust gas oxygen sensor in a lean air/fuel direction until an indication is provided that the converter is operating at desired efficiency;

modulating said current until a feedback control mode is initiated when a monitoring signal derived from said exhaust gas oxygen sensor output satisfies a threshold value; and adjusting said fuel delivery signal in response to a feedback variable derived from said exhaust gas oxygen sensor output during said feedback control mode.

16. The method recited in claim 15 further comprising the step of offsetting said fuel delivery signal by a preselected amount in a lean direction during an open loop fuel control mode which is prior to said feedback control mode.

17. The method recited in claim 15 further comprising the step of adaptively learning a first set of correction values during a portion of said feedback fuel control mode while said current is being coupled to said exhaust gas oxygen sensor, said first set of correction values being learned by comparing said feedback variable to a first feedback variable reference and correcting said fuel delivery signal in response to said first set of correction values.

18. The method recited in claim 15 further comprising the step of adaptively learning a second set of correction values during a portion of said feedback fuel control mode after said current is coupled to said exhaust gas oxygen sensor, said second set of correction values being learned by comparing said feedback variable to a second feedback variable reference and correcting said fuel delivery signal in response to said second set of correction values.

* * * * *